United States Patent
Rohrauer et al.

(10) Patent No.: US 7,176,425 B2
(45) Date of Patent: Feb. 13, 2007

(54) METHOD AND DEVICE FOR REGULATING THE TEMPERATURE OF A DRIVE ELEMENT

(75) Inventors: Markus Rohrauer, St. Florian (AT); Wolfgang Ensinger, Buchkirchen (AT)

(73) Assignee: TGW Transportgeräte GmbH, Wels (AT)

( * ) Notice: Subject to any disclaimer, the term of this patent is extended or adjusted under 35 U.S.C. 154(b) by 253 days.

(21) Appl. No.: 10/478,450

(22) PCT Filed: May 17, 2002

(86) PCT No.: PCT/AT02/00153

§ 371 (c)(1),
(2), (4) Date: Nov. 21, 2003

(87) PCT Pub. No.: WO02/095307

PCT Pub. Date: Nov. 28, 2002

(65) Prior Publication Data

US 2004/0118833 A1    Jun. 24, 2004

(30) Foreign Application Priority Data

May 23, 2001   (AT)   ................. A 822/2001

(51) Int. Cl.
*H05B 6/16* (2006.01)
(52) U.S. Cl. ................................... 219/653
(58) Field of Classification Search ............... 219/653, 219/647, 650, 652, 338, 700, 225; 198/952; 414/150, 159, 157, 158
See application file for complete search history.

(56) References Cited

U.S. PATENT DOCUMENTS

| | | | | |
|---|---|---|---|---|
| 3,365,301 A | * | 1/1968 | Lipoma et al. | 426/242 |
| 3,427,171 A | * | 2/1969 | Jeppson | 426/241 |
| 3,497,965 A | | 3/1970 | Cortellessa | |
| 3,607,667 A | * | 9/1971 | Knapp et al. | 203/11 |
| 3,614,365 A | * | 10/1971 | Lane | 219/684 |
| 3,807,186 A | | 4/1974 | Hardy | |
| 4,349,714 A | * | 9/1982 | Tamano | 219/700 |
| 4,417,507 A | | 11/1983 | Shotwell | |
| 4,549,053 A | * | 10/1985 | Haugh | 219/686 |
| 4,685,557 A | * | 8/1987 | Roinestad | 198/834 |
| 4,927,003 A | * | 5/1990 | Swinderman et al. | 198/497 |
| 4,942,134 A | | 7/1990 | Winefordner et al. | |
| 5,020,237 A | * | 6/1991 | Gross et al. | 34/265 |
| 5,025,123 A | * | 6/1991 | Pfaffmann et al. | 219/604 |

(Continued)

FOREIGN PATENT DOCUMENTS

CH        404821 A5    7/1966

(Continued)

*Primary Examiner*—Daniel Robinson
(74) *Attorney, Agent, or Firm*—Collard & Roe, P.C.

(57) ABSTRACT

The invention relates to a device (11) and a method of regulating a temperature of a drive element (2) which can be employed in a deep-freezing application in particular, such as a band, belt or similar, in which at least a part-region of the drive element (2) is heated at least during a relative displacement between the drive element (2) and a machine part. The drive element (2) is adjusted to a pre-definable minimum temperature and a pre-settable minimum temperature is maintained. To this end, the device (11) has at least one module (12), which supplies the drive element (2) with mechanical, electrical or electromagnetic energy, for example.

45 Claims, 5 Drawing Sheets

U.S. PATENT DOCUMENTS

| | | | |
|---|---|---|---|
| 5,135,122 A * | 8/1992 | Gross et al. | 219/685 |
| 5,182,427 A * | 1/1993 | McGaffigan | 219/663 |
| 5,793,024 A * | 8/1998 | Matsen et al. | 219/633 |
| 6,040,563 A * | 3/2000 | Matsen et al. | 219/633 |

FOREIGN PATENT DOCUMENTS

| | | |
|---|---|---|
| DE | 1959590 A | 6/1970 |
| DE | 1911786 A | 9/1970 |
| DE | 19713560 A1 | 12/1998 |
| DE | 19902759 A1 | 8/1999 |
| DE | 19908317 A1 | 10/2000 |
| FR | 2480418 A1 | 10/1981 |
| FR | 2682939 A | 4/1993 |
| JP | 09299072 A | 11/1997 |
| JP | 2001022198 A | 1/2001 |

* cited by examiner

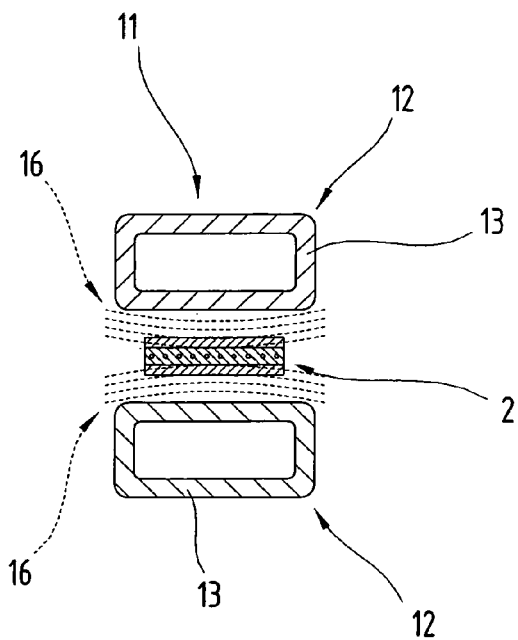
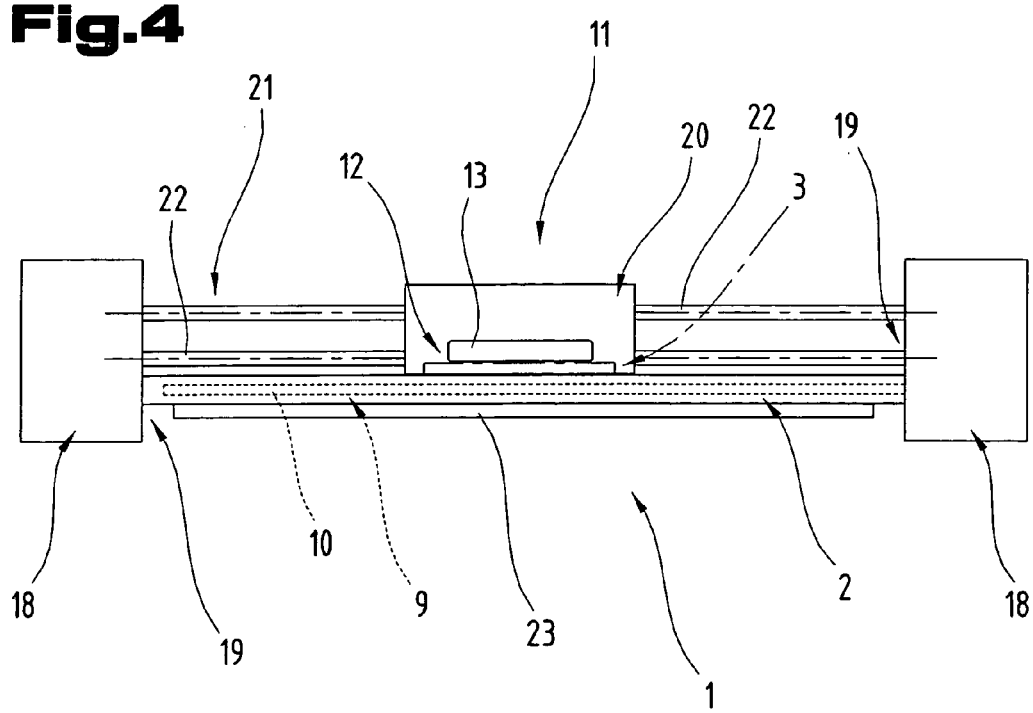

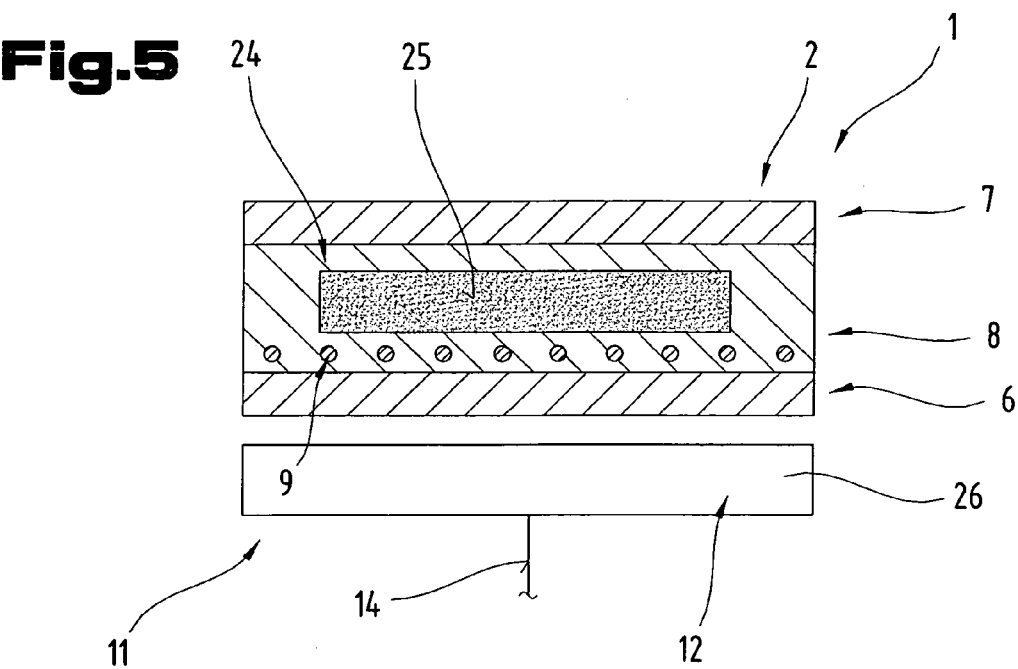
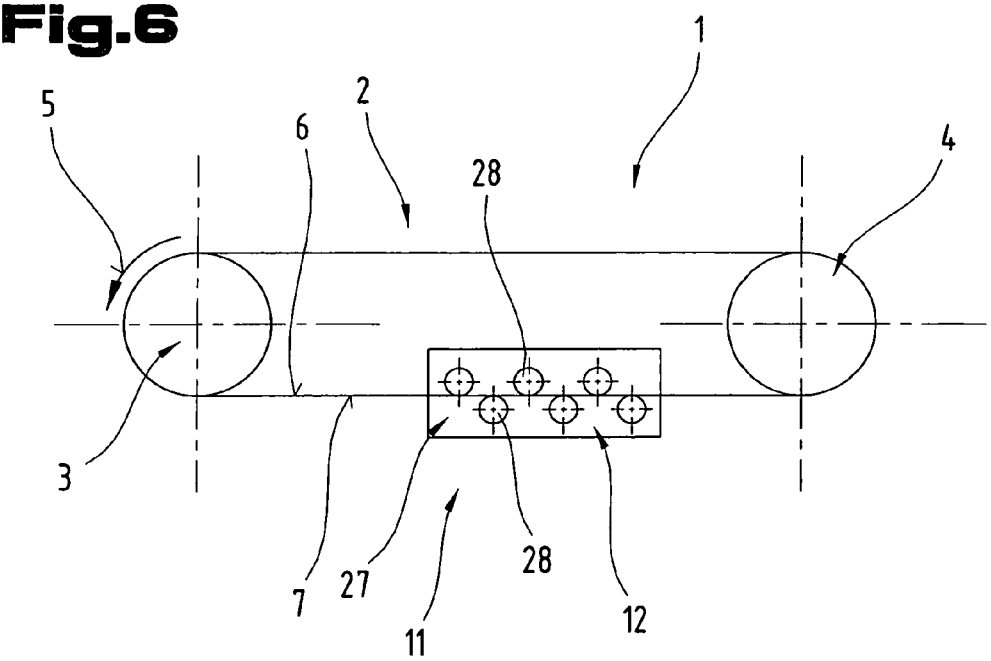

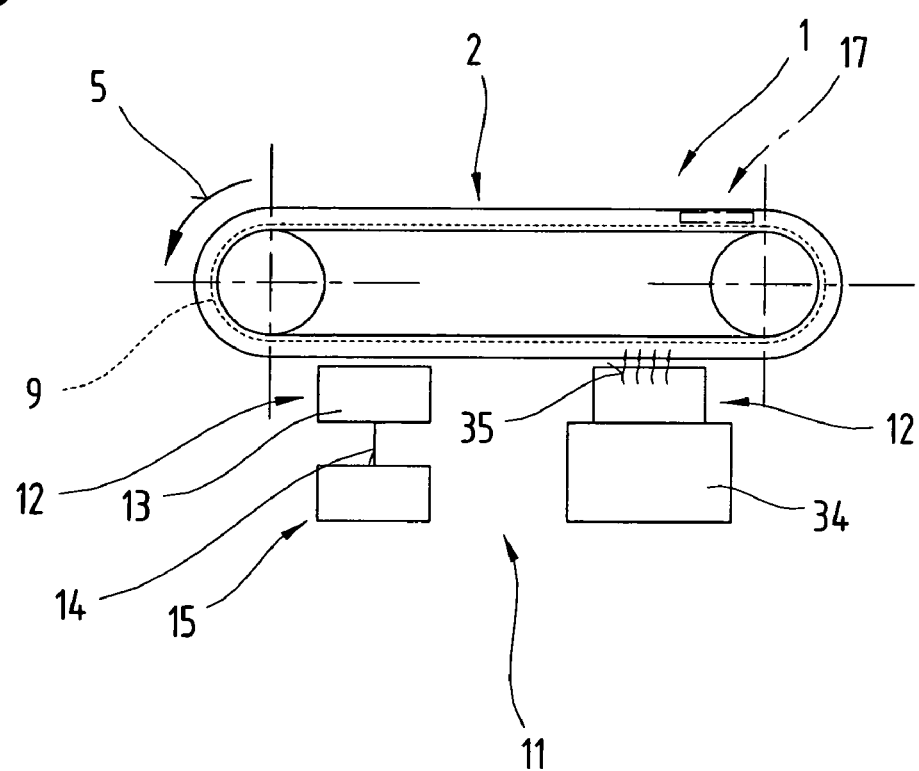

METHOD AND DEVICE FOR REGULATING THE TEMPERATURE OF A DRIVE ELEMENT

CROSS REFERENCE TO RELATED APPLICATIONS

Applicants claim priority under 35 U.S.C. §119 of AUSTRIAN Application No. A 822/01 filed on May 23, 2001. Applicants also claim priority under 35 U.S.C. §365 of PCT/AT02/00153 filed on May 17, 2002. The international application under PCT article 21(2) was not published in English.

The invention relates to a method of regulating the temperature of a drive element which is used in applications involving deep-freezing in particular, and a device for implementing this method, having the features defined in the generic parts of claims 1 and 22.

Productivity, cost pressures and time factors demand high availability and low cycle times of moving units, especially when used in deep-freezing applications. These requirements demanded of moving units and their driving elements have generally been satisfied in the past by using chain drives to generate a linear feed motion which can operate at temperatures of from 0° C. to approximately −80° C., for example, without their function being adversely affected. With the advent of modern, automated technology, however, such chain drives soon reached their limits due to their large dimensions and associated potential operating speeds, which are limited, as well as their loud noise and the stress generated due to impacts and vibrations induced during operation. Being made of simple construction means, they are only suitable for structures of a limited size and require a lot of maintenance if fault-free operation is to be guaranteed.

In more recent years, it has been suggested that chain drives should be replaced by belt drives, which are made from plastic materials with a low Shore hardness in order to retain their elasticity, even at very low temperatures. The realisation that belt drives were a viable option immediately offered the advantage of being able to operate moving units at higher speeds, although it was evident that belts of a specific Sore hardness would have to be used for different temperature ranges, in order to keep to a minimum the wear caused by brittleness, which is induced in particular by feeding rigid belt drives at increasingly high speeds round return pulleys at low temperatures. Accordingly, it became standard practice to use low Shore hardness values in order to counter this effect but this measure brought a disadvantage due to the fact that it increased the elasticity of the belts, especially when exposed to temperature fluctuations, which meant that optimum transmission of the driving forces and torques could no longer be achieved.

Accordingly, the objective of the invention is to avoid the known disadvantages of the prior art and to do so without having to modify or modifying only slightly the production conditions under which drive elements are required to operate, whilst preserving optimum properties in the drive element, even when used in applications involving very low or sharply fluctuating temperatures.

This objective is achieved by the invention as a result of the method defined by the characterising features of claim 1. The advantage of this method resides in the fact that a method based on simple laws of physics is used to regulate the temperature of a drive element, such as a belt or band, by means of which such drive elements can also be operated at temperatures of between 0° C. and −40° C., for example, whilst preserving the properties needed to guarantee dynamic operation of the moving unit within a plant in terms of factors such as acceleration, feed rate, etc. Even temperature fluctuations of between +15° C. and −40° C., for example, have no effect on the elasticity and strength of the driving element and hence the dynamics, e.g. acceleration, feed rate, of a drive mechanism used with moving units.

Other advantageous features which enable a pre-definable minimum temperature of the drive element in the range of approximately +5° C. to +25° C., in particular +10° C. to +22° C., e.g. +20° C., to be adjusted, set and maintained are specified in claims 2 to 7. The various features specified in the claims enable optimum adaptation and control of the temperature to suit different applications, for which purpose the minimum temperature is preferably obtained by delivering the requisite energy by means involving no contact in the case of endlessly circulating drive elements and by means involving contact in the case of non-endless drive-elements, and the module and energy or power to be delivered is specifically adapted and set for a specific type of drive element and/or making allowance for ambient influencing factors. More particularly the features specified in claim 7 now enable the use of drive elements of large dimensions and in spite of the fact that the drive element might have a large cross section, it is nevertheless possible to obtain a uniform distribution of heat or temperature through its cross-section and length, e.g. +20° C. Another advantage is the fact that the measures proposed by the invention can be used with the majority of drive systems known from the prior art.

Claims 8 to 10 define advantageous measures and features, whereby, even after longer periods of down time, it is now possible to start up a moving unit and immediately run it up to a high level of performance because the drive element can be pre-heated at least over a part of its length shortly before switching on the moving unit if necessary, and the temperature increased on a substantially continuous basis after and during operation. A pre-set temperature increase up to a pre-settable minimum temperature can be reached automatically within a specific time and this minimum temperature can then be kept at least almost substantially constant, at least for the period during which the moving unit is in operation using measuring means and appropriate control algorithms, which helps to improve the level of efficiency and productivity of moving units.

The embodiment of the method specified in claims 11 to 13 is also of advantage since it provides a simple means of installing and/or retrofitting on site the module needed to deliver the energy without the need for particularly complex systems, whilst additionally offering the possibility of being able to adapt to different requirements, such as the temperature range, the material from which the drive element is made, the installation area, etc., for example.

The features defined in claims 14 and 15 ensure a uniform temperature distribution and temperature control in and around the drive element, which in turn guarantees that the moving unit will exhibit uniform dynamic behaviour during operation and, in a broader sense, less stress on the mechanical construction.

As a result of the embodiments defined in claims 16 to 18, the effect of converting electric power into heat achieved by passing a current through an ohmic resistance is used as a means of obtaining a uniform temperature distribution in the drive element.

Also of advantage are the features specified in claims 19 to 21, whereby the temperature of the drive element, ambient conditions, circulation speed, feed rate, etc., are detected on at least certain sections and for certain periods of time, etc., so as to forward and/or output a measurement variable and an actual value which can be applied as a means of controlling the minimum temperature of the drive element via a control system. This enables very accurate adaptation, especially where drive units are used in highly sensitive areas. In particular, this measurement variable may also be primarily used as a means of controlling the frequency setting on the basis of a defined control algorithm, for example, thereby establishing a closed-loop automatic control circuit.

The objective of the invention is also achieved by means of the features defined in claim 22. The surprising advantage of this approach is that systems that have been tried and tested in practice in terms of the drive element and the module can be used for regulating the temperature of the drive element, and these are not only inexpensive to manufacture but have also proved themselves to be the best possible solutions.

The embodiments defined in claims 23 to 26 enable the use of standardised, inexpensive and sufficiently proven modules, such as induction coils, microwave generators, heating devices or similar to be used, which makes the system proposed by the invention by the invention highly reliable, especially the module. Another major advantage is the fact that the individual modules already have the optimum specifications and are mostly already relatively small in terms of their dimensions, so that the space needed to accommodate the system proposed by the invention can be kept to a minimum.

The advantage of the embodiments defined in claims 27 to 30 is that the strengthening supports which have to be provided in the drive elements as a matter of course anyway serve as the ohmic resistance which is vital as a means of dissipating heat, permitting the use of all drive elements known from the prior art which are also capable of transmitting high driving forces.

As a result of the embodiment defined in claim 31, the strengthening supports provided in the belt act as an electromagnetic conductive core, which helps to produce a further increase in flow density and hence the voltage or current induced in the loop.

Advantages are also to be had by using aramide or steel fibres or glass fibres for the strengthening supports, as described in claim 32.

The embodiments defined in claims 33 and 34 offer embodiments of simple construction designs for inducing the voltage or current needed to change the magnetic flow, in the former case when using alternating voltage and in the latter case when using direct voltage. Varying the overlap between the module and the drive element, which determines flow density, enables the magnetic flow to be influenced as required, thereby ensuring optimum adaptation to different applications.

In another embodiment defined in claim 35, the module is provided directly in or on the casing which has to be provided for safety reasons in any event, offering the possibility of improving temperature regulation still further because the surface area which is decisive with regard to changing the magnetic flow can be increased to a maximum.

The embodiment defined in claim 36 permits the use of standardised, inexpensive induction coils.

Another embodiment defined in claim 37 offers another reliable solution to regulating the temperature in the drive element and provides a simple means of maintaining a pre-settable minimum temperature because, although the drive element incorporates at least one passage, it is nevertheless very simple to manufacture and co-operates with the module so that the temperature of the drive element can be regulated rapidly and a minimum temperature set, in particular an operating temperature, even under the harshest conditions.

This being the case, other embodiments defined in claims 38 to 41 may be used, which allow the system proposed by the invention to be employed with different systems, in particular endless and non-endless drive elements.

The design proposed by the invention is primarily suitable for use with all flat belts, V-belts or cogged belts of various structures known from the prior art, as described in claims 42 and 43.

As a result of the embodiment defined in claim 44, the temperature prevailing in or at the drive element can be immediately detected, using tried and tested yet inexpensive systems known from the prior art, which means that the drive element can be monitored on a permanent basis if necessary.

Finally, the embodiment defined in claim 45 is also of advantage because by pre-defining a control algorithm and the actual value input for the temperature via the measuring means and optionally entering a default setting for the ambient temperature, a pre-definable minimum temperature optimised for these conditions can be set or predefined, after which a permanent control of the actual value of the temperature can be run on the basis of the control algorithm and the detected parameters applied to the closed-loop control circuit.

The invention will be described in more detail with reference to the examples of embodiments illustrated in the appended drawings.

Of these:

FIG. 3 is a highly simplified diagram in section along line III—III indicated in FIG. 1 of the power-generating module;

FIG. 4 is a highly simplified, schematic diagram showing a plan view of another embodiment of the device proposed by the invention, with the moving unit and the power-generating module;

FIG. 5 is a highly simplified, schematic diagram in partial section, showing another embodiment of the drive element and module;

FIG. 6 is a highly simplified, schematic diagram depicting another embodiment of the device proposed by the invention, with the moving unit and the power-generating module;

FIG. 9 is a highly simplified, schematic diagram showing a side view of another embodiment of the device proposed by the invention, with the moving unit and a different embodiment of the power-generating module, this time incorporating an illustrative array of several modules.

Figure 1:
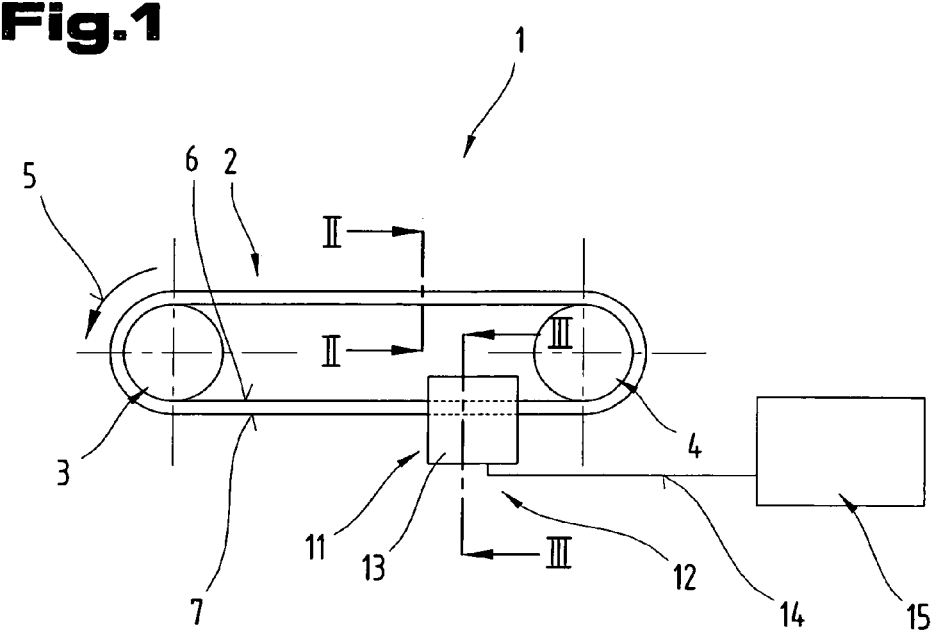
FIG. 1 is a highly simplified, schematic diagram showing a side view of a device as proposed by the invention with a conveyor unit and a power-generating module.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 2:
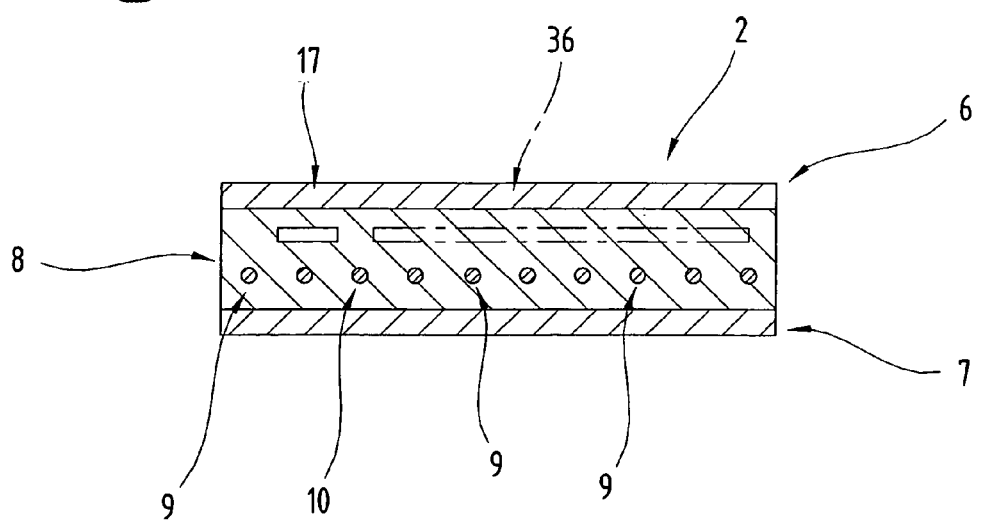
FIG. 2 is a highly simplified, schematic diagram in section along the line II—II indicated in FIG. 1 of a drive element of the moving unit.

FIGS. 1 to 3, which will be described together, illustrate different views of a moving unit 1 incorporating a belt-type drive element 2. As illustrated in the embodiment chosen as an example here, the drive element 2 is of an endless design and is driven by at least one driving member 3 and turned back around at least one driven member 4. As a machine part, the driving member 3 is fixed in its position relative to the drive element 2, whilst the drive element 2 is displaceable relative to it. The driving and driven members 3, 4 are provided in the form of a pulley wheel seated respectively on a driving shaft and a driven shaft. The driving member 3, which is driven by a motor system, not illustrated, transmits the rotary force between the drive element 2 and the driving member 3 by means of frictional and/or positive force. Accordingly, the drive element 2 may be provided in the form of a flat belt or V-belt or cogged belt of any type. In this particular embodiment, the drive element 2 is provided as a flat belt. When rotary force is applied to the drive element 2, it is displaced in a forward motion in a pre-definable direction of rotation, which can be reversed by the drive motor, not illustrated, for example in the direction indicated by arrow 5.

The skilled person will be familiar with the structure of these drive elements 2, such as bands, belts, conveyor belts, and only a brief description of them is therefore necessary. As illustrated in FIG. 2, the drive element 2 has a running layer 6 facing the driving and driven members 3, 4, a top layer 7 remote from the latter and a traction layer 8 disposed between the two. Strengthening supports 9 are preferably provided in the drive element 2, preferably in the region of the traction layer 8, extending parallel with one another and preferably running across the entire length of the drive element 2. The strengthening supports 9 may be made from any materials known from the prior art, such as polyester, polyamide, steel and glass fibres or aramide, for example. If the strengthening supports 9 are made from aramide and/or steel and/or glass fibres, the circulating strengthening supports 9 constitute an electrically conductive loop 10 or line. The strengthening supports 9 may be made in the form of a steel cable, for example, with several strands. The running, top and traction layers 6, 7, 8 may be made from different or identical materials, such as those which have been used as standard in the prior art for some time. The same also applies to the geometric shape of the strengthening supports 9. Accordingly, these may be helical, for example.

Especially if the moving unit 1 incorporating the drive element 2 is to be used at low temperatures, more especially in applications involving freezing and deep-freezing, for example at 0° C. and −80° C., or in low ambient temperatures such as between 0° C. and −40° C. for example, it will be necessary to regulate the temperature of or heat the drive element 2 to a pre-defined minimum temperature, in order to ensure that the moving unit 1 is sufficiently dynamic, even at these low temperatures. Consequently, a device 11 of the type illustrated in FIG. 1 is proposed, incorporating at least one module 12 which transmits or delivers energy without making contact, provided in the form of an induction system, in particular an induction coil 13, in this particular embodiment. This module 12 is expediently linked to a control unit 15 via a connecting line 14 to enable parameters, data, signals and information to be transmitted. In the most basic situation, this connecting line 14 might be a two-wire line or a bus line. A control unit 15 of this type used to activate the module 12, in particular the induction coil 13, is known per se and is therefore only symbolically indicated as a box-shaped body. The control unit 15 additionally has control and automatic control means as well as a control algorithm. The module 12, or as is the case in this embodiment modules 12, of the device 11 are stationary relative to the endlessly circulating drive element 2 and extend across at least a part of the length of the drive element 2. The modules 12 may be disposed in the region of the non-driving free length and/or the tight side adjacent to the running and/or top layer 6; 7 and/or extending through a thickness of the drive element 2. The drive element 2 in the embodiment illustrated in FIG. 3 is moved past or through two energy fields 16. Naturally it would also be possible to provide only one module 12 and induction system, in particular one induction coil 13, and feed the drive element 2 through one energy field 16. However, this embodiment is not illustrated. The module 12 is designed with a substantially U-shaped or C-shaped cross section extending across a part of the length of the drive element 2 and at least more or less encases the drive element 2.

At least the stationary induction coil 13, to which alternating current is applied, is provided in the form of a network-side primary winding and induces current or voltage in at least one strengthening support 9 made from an electrically conductive material and constituting the secondary winding, due to the changing magnetic flow. Various measures known from the prior art could naturally be employed as a means of strengthening the energy field 16 or increasing the magnetic flow, such as using ferromagnetic materials, for example an iron core. A distance or air gap between the drive element 2 and module 12 should be kept as short as possible.

As a result of the displacement of the drive element 2 relative to the module 12 and hence the energy field 16, in particular the electromagnetic field, a uniform, pre-definable minimum temperature can be generated and maintained essentially across the entire length and cross-section of the drive element 2. As a result of the invention, it is now possible for the drive element 2 to be warmed or heated to a pre-defined minimum temperature during a relative displacement between it and the at least one module 12 by supplying energy. The variables used as settings for the primary-side induction coil 13 energised with alternating current are primarily-the frequency and optionally the current amplitude. The electromagnetic energy field 16 is generated by the induction coil 13 operated in the medium- or high-frequency range, this frequency range being between 1 kHz and 150 kHz, for example 50 kHz.

Energising the drive element 2 and the electrically conductive strengthening supports 9 with the energy field in certain sections and for certain periods of time, at least in a part-region of the drive element 2, generates heat due to dissipation, which depends in particular on the frequency of the primary-side induction coil 13. The control unit 15 is configured so that the frequency is set, for example, depending on the rotation speed of the drive element 2 and/or the temperature to which the drive element 2 is exposed and/or an actual value of the temperature determined by a measuring means 17, for example a thermocouple, pyrometer, which detects the temperature without involving any contact. The drive element 2 may be equipped with measuring means 17 disposed in different regions of the drive element 2 and spaced at a distance apart from one another in its lengthways direction in order to detect the actual value of the temperature intermittently at specific points. These individually detected actual values of temperature are forwarded to the control unit 15, where they are used to derive the arithmetic mean value of the temperature with a view to automatically applying parameters, such as the frequency of the induction coil 13 or a microwave generator, the heat output of a module 12 transmitting energy without contact and the amplitude of the current flowing through the strengthening supports 9. These individual parameters are determined using drive motors known from the prior art, incorporating incremental transmitters and other sensor systems, such as temperature sensors, strain gauges, thermocouples, for example. The sensor systems used to detect ambient influences, such as air humidity, ambient temperature, etc., are arranged in the general surrounding area, i.e. in the room where the moving unit 1 is installed, and are connected to the control unit 15 to permit data transmission. Measuring means 17 are provided on or in the drive element, in order to determine the actual value of its temperature. The actual value of the temperature of the drive element 2 may be detected in the running layer 6 and/or in the top layer 7 and/or traction layer 8 and each of the individual measurement values is forwarded to the control unit 15 so that a control variable for the parameter can be determined. Alternatively, the actual value of the temperature may also be detected by other means which do not involve contact.

The operating factors which have to be set, such as the requisite drive dynamics, e.g., acceleration of a machine part, as indicated in FIG. 4, or rotation speed of the drive element 2 etc., and the driving behaviour of the moving unit 1, and/or the minimum temperature or operating temperature of the drive element 2, are determined automatically and set as an optimum value by the control unit 15 or as a variable value by an operator, for example. In order to enter a default for and automatically set the minimum temperature, at least one ambient factor, such as the ambient temperature and/or the air humidity and/or at least one of the operating factors such as the coefficient of friction between the drive element 2 and at least the driving member 3, or the acceleration of the machine part, is processed and taken into account as part of a control process in an automatic control system such as a fuzzy logic, neuro-fuzzy systems etc. The option of being able to adjust and adapt the minimum temperature to a specific application enables the dynamic behaviour of the moving unit 1 to be improved significantly and substantially reduces the wear behaviour of the drive element 2. Above all, the method proposed by the invention makes it possible to react to temperature fluctuations.

It should be pointed out at this stage that the energy field 16 need not necessarily be generated by means of the essentially inductive elements described above and the energy field 16 may also be generated by capacitive elements instead, such as capacitors, in which case the drive element 2 will be fed through the electric field generated. The electric field generated is used to supply the energy needed to adjust or maintain the pre-definable temperature of the drive element 2.

The moving unit 1 in this embodiment is a conveyor unit such as a load-bearing conveyor for individual items, etc., or a drive unit for driving machinery. If the temperature-regulated drive element 2 is provided in the form of a cogged belt, it may be designed as a timing chain used for determining the displacement path of a carriage, etc., for example.

FIG. 4 illustrates another embodiment of the moving unit 1 with the belt-type drive element 2. In this embodiment, the energy is delivered and transmitted by a system involving contact. The drive element 2, in particular the cogged belt, is of the non-endless type and extends between two bearing and retaining mechanisms 18 spaced at a distance apart from one another, to which its oppositely lying end regions 19 are linked. The moving unit 1 in the embodiment illustrated as an example here is a linear unit with a machine part 20 which can be displaced relative to the drive element 2, which is displaceable or slidable by means of the driving member 3 indicated by broken lines. The machine part 20 is guided by means of a schematically indicated guide mechanism 21 and is slidingly positioned by means of guide rods 22 forming the guide mechanism 21. Naturally, this design of the guide mechanism 21 is merely given as an example and any other guide mechanism 21 known from the prior art could also be used.

A support strip 23 is preferably provided on a side of the drive element 2 remote from the machine part 20, extending across at least a part of the length of the drive element 2, which absorbs the rotary forces transmitted by the driving member 3 in a direction at an angle or perpendicular to the drive element 2. The machine part 20 has at least one module 12, which is preferably disposed at a short distance from the drive element 2 and is preferably provided in the form of an induction coil 13. The machine part 20 might be the module 12. The primary-side induction coil 13 of the machine part 20 energised with alternating current induces current or voltage in the loop formed by the strengthening supports 9 and the electrical attenuation which occurs as the current flows through the strengthening supports 9 is converted into heat. An iron core may be provided between the primary-side induction coil 13 and the secondary-side loop 10 as a means of increasing the magnetic flow, for example. A part-region of the machine part 20 may serve as this core. Another possibility of improving inductive heating is to provide an iron core on the machine part 20 which extends around at least certain regions of the drive element 2 but preferably all sides of it, for example, on a side of which the primary-side induction coil 13 is disposed, whilst the secondary winding incorporating at least one winding or loop 10, which may or may not be short-circuited, is provided on the oppositely lying side. This will mean that the input-side frequencies, in particular low frequencies, of the primary-side induction coil 13 can be kept low.

Although not illustrated, another possible embodiment of the strengthening supports 9 is one in which it has at least one winding and when a direct voltage is applied to terminal contacts, the strengthening supports 9 essentially act as a heating element, enabling the pre-definable minimum temperature to be set and/or maintained in the stationary drive element 2.

FIG. 5 illustrates another embodiment, which may be construed as an independent solution in its own right. Illustrated in cross-section, the drive element 2 of the moving unit 1 has one or more layers, in particular the running layer 6, top layer 7 and traction layer 8, and the traction layer 8 is optionally provided with the strengthening supports 9 and at least one passage 24, which contains a liquid 25 with a high boiling point. A module 12 which generates wave power, in particular microwave energy, co-operates with the drive element 2. Microwave generators of this type are already known from the prior art. As proposed by the invention, the temperature of the drive element 2 is regulated and the pre-definable minimum temperature is set and maintained due to the fact that the liquid 25 with a high boiling point is contactlessly irradiated with microwave energy so that it and the drive element 2 are heated, at least in the region where the passage 24 is located. The passage 24 expediently extends along the entire length of the drive element 2. This drive element 2 may be either endless or of a non-endless design. Another possible approach is one in which the strengthening supports 9 have a coil so that when a direct voltage is applied, the strengthening supports 9 essentially act as a heating element, so that energy is transmitted in a controlled manner to the heat-transmitting liquid. This feature enables the temperature of even more robust drive elements 2 to be regulated. If the drive element 2 has a thick cross section, passages 24 may be provided in several planes one above the other.

FIG. 6 provides a highly simplified, schematic diagram illustrating another embodiment of the device 11, in particular the module 12. As described above in connection with the other drawings, the moving unit 1 has at least one driving member 3 and at least one driven member 4, by means of which the endlessly circulating drive element 2 is driven at a pre-definable rotation speed and feed path or displacement direction—indicated by arrow 5. In this embodiment, the drive element 2 is a load-bearing conveyor element, for example, in particular a conveyor belt such as a continuous flow conveyor for example, which is used in areas in which low ambient temperatures prevail, especially in an area where deep-freezing is taking place. Naturally, the temperature-regulated drive element 2, such as a band, belt or similar, may also be used as a timing belt on machinery incorporating the moving unit 1. As illustrated, at least one module 12 is provided, extending across at least a part of the length of the drive element 2, by means of which the pre-definable minimum temperature of the drive element 2 is maintained by applying energy by a system which involve contact. In this special application, the module 12 has at least one means 27, for example several rollers 28, abrasive strips or similar, which create internal or external frictional energy between the drive element 2 and the means to generate heat.

Rollers 28, in particular friction rollers, are expediently disposed at a distance apart from one another in the longitudinal direction and engage with the two mutually remote running and top layers 6, 7, which causes a maximum permissible deformation in at least certain regions of the drive element 2, creating an increase in temperature depending on the peripheral speed of the drive element 2 and the deformation energy generated. The rollers 28 spaced apart by a thickness in the longitudinal extension of the drive element 2 are designed so that they can be displaced relative to one another, so that a reduction in the distance corresponding to the thickness of the drive element 2 will induce an increase in the deformation energy. In order to operate this displacement, at least one but preferably several rollers 28 in the direction perpendicular to the feed motion—indicated by arrow 5—are connected to the control unit 15 via a displacement drive, not illustrated. The at least one actual value of the temperature of the drive element 2 is detected by at least one measuring means 17 connected to the control unit 15 and transmitted to the control unit 15 in the form of data, where it is processed in the control algorithm to obtain a control variable for the parameter, in particular to adjust a distance as measured between oppositely lying rollers 28. As a result, the module 12 for transmitting energy is then activated by the control unit 15 whenever the actual value of the temperature of the drive element 2 falls below the threshold value for the minimum temperature in the positive temperature range or exceeds an upper threshold value.

An optimum setting in is one where the rollers 28 are spaced apart one above the other at a distance that is only slightly smaller than the maximum thickness of the drive element 2 and the peripheral speed is increased to a maximum. Naturally, the rollers 28 may also be heated and the heat energy transmitted to the drive element 2 by contact or heat transmission. To this end, the rollers 28 are made from a material that is a good heat conductor. In order to provide the means 27 with a larger heat-transmitting surface area, it would also be possible to provide the running and top layers 6, 7 respectively with at least one heated abrasive strip instead of using rollers 28. The temperature of the drive element 2 can be detected without contact or by means of at least one other measuring means 17, not illustrated.

Figure 7:
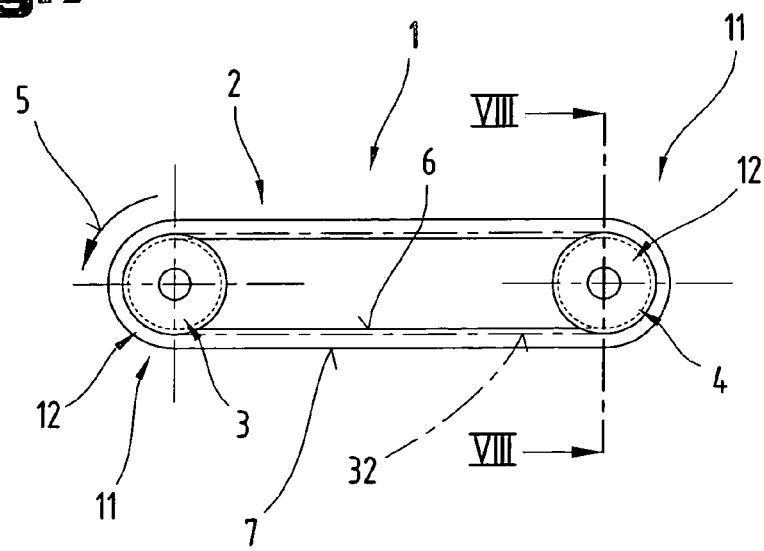
FIG. 7 is a highly simplified, schematic diagram showing a side view of the device proposed by the invention, with the moving unit and a different embodiment of the power-generating module.
Figure 8:
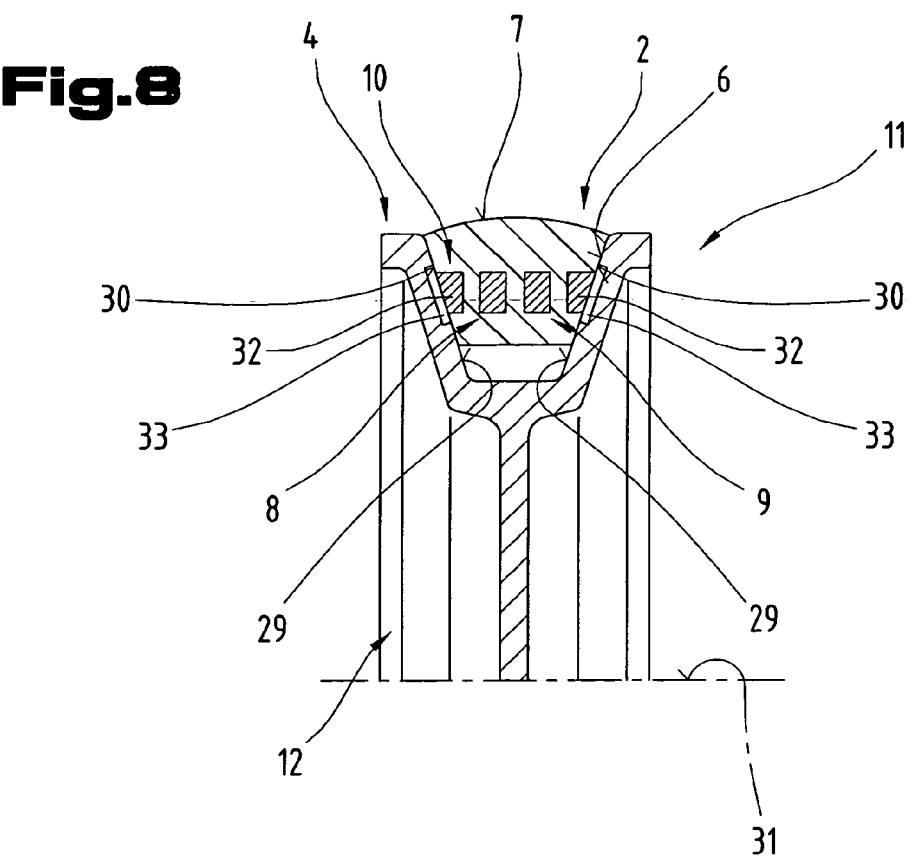
FIG. 8 is a highly simplified, schematic diagram in section along line VIII—VIII indicated in FIG. 7, showing the module and a belt pulley with the drive element.

FIGS. 7 and 8, which will be described together, provide highly simplified, schematic diagrams illustrating another variant of the device 11 co-operating with the moving unit 1. As explained in detail above, the moving unit 1 has at least one driving member 3, and at least one driven member 4, by means of which the drive element 2 can be moved along at a pre-definable peripheral speed and in a pre-definable feed motion and feed direction—indicated by arrow 5. In this embodiment, the temperature is regulated by applying energy by means which involve contact. It is preferable to use an endlessly circulating V-belt for this embodiment, with a substantially trapezoidal or V-shaped cross section, in which belt running faces 30 bounded by belt pulley running faces 29 converge with one another at an angle in the direction of a rotation axis 31. The drive element 2 also incorporates the top layer 7 overlapping with the running layer 6, between which the traction layer 8 with the strengthening supports 9 is disposed.

The strengthening supports 9 are made from an electrically conductive material. At least some of the strengthening supports 9 are designed so that they constitute electrical contacts 32 in the region of the belt running face 30 which link up with contact points 33 disposed at least in a part-region of the belt pulley running faces 29 in order to supply electrical energy. As a result of the belt tension relative to the belt pulley and due to the at least looping connection between the contacts 32 and contact points 33, a conductive connection is established in order to regulate the temperature of the drive element 2. A surface of the contact points on the belt pulley-side extends parallel with and in planar arrangement with respect to the belt pulley running face 29, so as to avoid any adverse effects on the circumferential forces to be transmitted. Naturally, the belt pulley may also be designed so that a peripheral zone surrounding the core zone of the belt pulley facing the drive element 2 is made from a conductive material, whilst the core zone is made from an insulating material, in particular plastic, for example polyurethane. By providing the belt pulley with this multi-part structure, no electric current will be transmitted to other machine parts. The structural design as well as the different materials which may be used for the belt pulley are already known from the prior art.

Another way of establishing a reliable contact between the belt-side contacts 32 and the contact points on the belt pulley is to design the contact points 33 as resiliently elastic elements, which stand proud of the belt pulley running surfaces 29 when the drive element 2 is in the slack state and the contact points 33 are not pushed by the contacts 32 against their bias until the pre-selectable tension of the drive element 2 is applied relative to the belt pulley, thereby producing the planar surface again. Accordingly, the positive potential is applied to the driving member 3 forming the first module 12 and the negative potential is applied via the other module 12 constituting the driven member 4.

The driving and/or driven member 3, 4 forming the module 12 may naturally also permit the contactless supply of energy for regulating the temperature as described in respect of FIGS. 1 to 5, in which case one or more induction coils 13, not illustrated, or the microwave generator 26 will be provided in or on the belt pulley and current or voltage induced in the strengthening supports 29 and the loop 10 formed by them. In this embodiment, at least one measuring means 17 is provided in the form of a pyrometer, not illustrated, installed at a slight distance from the drive element 2, by means of which the actual value of the temperature is detected without any contact.

FIG. 9 is a highly simplified, schematic diagram illustrating another embodiment of the moving unit 1 and the device 11 co-operating with it. The device 11 has two separately installed modules 12, one of the modules 12 being provided in the form of an induction coil 13 which co-operates with the strengthening supports 9 of the drive element 2 as explained in detail above, and the other module 12 being a heating element which operates without contact. The latter module 12 may be a heat exchanger or similar using the heat radiated from the module 12, in particular a drive 34, and in the case of a drive 34, the dissipated heat is used to regulate a temperature and maintain a pre-definable minimum temperature in at least certain regions of the drive element 2. As a result of the irradiated heat energy, a flow of heat 35 can be applied to at least certain regions of the drive element 2, thereby also enabling energy to be supplied in this application without contact.

It should be pointed out that this stage that the module 12 may naturally also be arranged so that it can be displaced relative to the drive element 2, which means that the drive element 2 can be heated at least to a run-up temperature that is lower than a minimum temperature so whilst the drive element 2 is stationary, for example during a dwell time when a moving unit 1 is in a standby position, and during operation by increasing the energy or power delivered to the drive element 2 and/or by switching on another module 12 which sets the pre-settable minimum temperature within a pre-settable time via one or preferably several measuring means 17, after which the actual value of the instantaneous temperature of the drive element 2 is detected in at least certain regions and at certain times and compared with a pre-set desired value of the minimum temperature, and if the measured actual temperature is found to deviate from the pre-definable desired value or if the actual value of the minimum temperature deviates from at least one pre-set threshold value for the minimum temperature, the requisite parameters are applied to at least one of the modules 12, such as frequency, current amplitude, power, etc., in order to adapt the temperature to the desired value of the minimum temperature. An optimum setting can be obtained and above all the optimum minimum temperature can be maintained, once it has been set, by the closed-loop automatic control circuit and by detecting the actual values at least intermittently under all operating conditions and taking account of the ambient influences, such as ambient temperature, air humidity, etc.

Let us take the example of a situation where a temperature of −20° C. and an air humidity of 60% prevails in the ambient environment, for example in a cold-store of a warehouse or outside a building. The machine part 20 displaceable by the drive element 2 has to be displaced at a speed of 5 m/sec. By employing the invention, the ambient influencing factors and/or at least one operating factor can be taken into account in the control algorithm used to compute and define the desired value or threshold value for the minimum temperature of the drive element 2 under these conditions, which might be +15° C. for example, and at least one parameter is changed during operation of the moving unit 1, such as the frequency of the induction coil 13 or the microwave generator 26, the heat output of a module 12 which transmits energy without contact, the amplitude of the current flowing through the strengthening supports, or the distance between oppositely lying rollers 28, until the optimum minimum temperature is reached and set. To this end, it is necessary to detect intermittently at least one actual value of the temperature in a section of the drive element 2 by means of at least one measuring means 17 and this is then forwarded to the control unit 15. As a result, the module 12 will then be activated by the control unit 15 so as to emit or generate or transmit energy intermittently if the actual value of the temperature of the drive element 2 is below the threshold value of the minimum temperature of +15° C., for example, in the positive temperature range and/or above the upper threshold value of +25° C., for example, in the positive temperature range. If the drive element 2 has to be heated to a temperature of preferably +15° C. when the moving unit 1 is operating at −20° C., for example, the actual value of the temperature of the drive element 2 is detected by the measuring means 17 in cycles. If the actual value of the temperature corresponds to or falls below the pre-definable lower threshold value of +15° C. for the minimum temperature, for example, at least one parameter such as the frequency of the induction-coil 13 will be changed until the drive element 2 reaches the minimum temperature of +15° C. again. The drive element 2 therefore has to be heated by applying energy and to do this it is necessary to supply only some of this energy because the drive element 2 can be heated to the pre-set minimum temperature across its entire length and/or thickness due to the relative displacement between the module 12 and the drive element 2. Naturally, it would also be possible to set a positive temperature range for the minimum temperature, for example +15° C. bis +25° C., defined by the lower and upper threshold value of the minimum temperature. If the upper threshold value for the minimum temperature is reached, for example +25° C., energy will cease to be transmitted via the module 12 until the detected actual value of the minimum temperature drops to +15° C. for example, after which the energy applied will be regulated to maintain the minimum temperature of +15° C., for example.

Naturally, it would also be possible to define the parameters of the module 12 for a specific application, in which case it will still be preferable to use the embodiment described above. For example, the frequency of the induction coil 13 needed to obtain the minimum temperature of +18° C., for example, at an ambient temperature of −20° C., for example, can be set so that it essentially can not be changed. The advantage of this embodiment is that no measuring means 17 are needed to detect the actual value of the temperature of the drive element 2.

As indicated in FIG. 2, another embodiment of the invention offers the option of providing at least one electrically conductive film 36 in the drive element 2 to form the loop 10 which transmits the induced voltage or the induced current. The loop 10 of electrically conductive film 36 may be endless or non-endless and has a slimmer thickness than the thickness of the drive element 2, which means that the method proposed by the invention can also be used with drive elements 2 of lesser thicknesses. Using standard aluminium films, for example, it would be possible to make loops 10 with a thickness of between 2 μm and 30 μm. Alternatively, the loop 10 may also be made from an electrically conductive film 36 of copper, between 100 μm and 200 μm thick. Finally, it would also be possible to make the loop 10 from an electrically conductive film 36 made from a steel alloy or spring steel. The loop 10 obtained by the film 36 is preferably flat and extends along at least a part of the length and width of the drive element 2. Naturally, the film 36 may also constitute the strengthening supports 9, which obviates the need to provide additional strengthening supports 9. The film 36 may also be a plastic film coated with metal, in which case the metal coating may be printed or vapour-deposited on the plastic film.

It should be pointed out that the structure and operating mode of the moving units 1 with their drive elements 2 described above are given by way of example only. It would also be possible for the drive element 2 to be made without any strengthening supports 9, for example. The same applies to the design and layout of the modules 12. The module or modules 12 may be mounted at any point, such as to the side and/or above and/or underneath the drive element 2.

For the sake of good order, it should be pointed out that, in order to provide a clearer understanding of the structure of the moving unit and device, they and their constituent parts are illustrated to a certain extent out of scale and/or on an enlarged scale and/or on a reduced scale.

The independent solutions proposed by the invention and the associated objectives may be found in the description.

Above all, the subject matter of the individual embodiments illustrated in FIGS. 1, 2, 3; 4; 5; 6; 7, 8; 9 may be construed as independent solutions proposed by the invention in their own right. The objectives and associated solutions may be found in the detailed descriptions of these drawings.

LIST OF REFERENCE NUMBERS

| | |
|---|---|
| 1 | Moving unit |
| 2 | Drive element |
| 3 | Driving member |
| 4 | Driven member |
| 5 | Arrow |
| 6 | Running layer |
| 7 | Top layer |
| 8 | Traction layer |
| 9 | Strengthening supports |
| 10 | Loop |
| 11 | Device |
| 12 | Module |
| 13 | Induction coil |
| 14 | Connecting line |
| 15 | Control unit |
| 16 | Energy field |
| 17 | Measuring means |
| 18 | Bearing and retaining mechanism |
| 19 | End region |
| 20 | Machine part |
| 21 | Guide mechanism |
| 22 | Guide rod |
| 23 | Support strip |
| 24 | Passage |
| 25 | Liquid |
| 26 | Microwave generator |
| 27 | Means |
| 28 | Roller |
| 29 | Belt pulley running surface |
| 30 | Belt running surface |

-continued

| | |
|---|---|
| 31 | Rotation axis |
| 32 | Contact |
| 33 | Contact point |
| 34 | Drive |
| 35 | Heat flow |
| 36 | Film |

The invention claimed is:

1. Method of regulating a temperature of a drive element (2), such as a band, belt or similar, employed in applications involving freezing or deep-freezing, whereby at least a part-region of the drive element (2) is heated by means of a module (12) generating and/or transmitting energy, characterised in that the actual value of the temperature of the drive element (2) is detected and, whenever the actual value of the temperature deviates from at least one pre-set threshold value for the minimum temperature, the module (12) is activated by a control unit (15) in order to supply energy so that the drive element (2) is adjusted to a pre-definable minimum temperature and maintained at a pre-definable minimum temperature.

2. Method as claimed in claim 1, characterised in that an electrically conductive loop (10) in or on the drive element (2) supplies energy in order to maintain the minimum temperature.

3. Method as claimed in claim 1, characterised in that the minimum temperature of the drive element (2) is maintained by supplying energy by means which involve no contact or involve contact.

4. Method as claimed in claim 1, characterised in that the minimum temperature of the drive element (2) is maintained by delivering energy from a module (12) radiating heat, in particular a drive (34), optionally via an inter-connecting heat exchanger.

5. Method as claimed in claim 1, characterised in that the minimum temperature of the drive element (2) is maintained by applying the heat dissipated by the module (12).

6. Method as claimed in claim 1, characterised in that the minimum temperature of the drive element (2) is maintained by means (27) acting in or on the drive (2) element generating frictional energy, for example friction rollers, abrasive strips.

7. Method as claimed in claim 1, characterised in that a liquid (25) with a high boiling point is circulated through the drive element (2) and the minimum temperature of the drive element (2) is set and maintained by applying wave energy from the module (12).

8. Method as claimed in claim 1, characterised in that the stationary drive element (2) is heated to a pre-definable temperature.

9. Method as claimed in claim 1, characterised in that at least certain regions of the drive element (2) of a displacement system (1) are pre-heated whilst it is stationary and at least certain regions are adjusted to a pre-definable minimum temperature during operation, after which this set minimum temperature is maintained.

10. Method as claimed in claim 1, characterised in that at least one control algorithm is used to set the minimum temperature so that the minimum temperature of the drive element (2) can be maintained at least almost substantially constant.

11. Method as claimed in claim 1, characterised in that the drive element (2) is fed past or fed through at least one energy field (16).

12. Method as claimed in claim 11, characterised in that the energy field (16) is a mechanical or magnetic or electrical or electromagnetic field.

13. Method as claimed in claim 11, characterised in that the electromagnetic field is preferably a medium-frequency or high-frequency alternating field.

14. Method as claimed in claim 1, characterised in that at least one energy field (16) or energy is applied intermittently to at least certain regions of the drive element (2) across a major part of, preferably its entire, length in order to maintain the minimum temperature.

15. Method as claimed in claim 1, characterised in that the module (12) supplying energy to the drive element (2) is activated or switched off when prompted by the control unit.

16. Method as claimed in claim 11, characterised in that the energy field (16) is an eddy current or a voltage induced in the loop (10) and heat is generated as the current flows through the loop (10).

17. Method as claimed in claim 11, characterised in that the energy generates heat as the current flows through the loop (10).

18. Method as claimed in claim 11, characterised in that energy is applied directly to the loop or by means of the energy field (16) outside of the loop (10) and actively linked to it.

19. Method as claimed in claim 11, characterised in that the actual value of the temperature of the drive element (2) is determined at least intermittently or at certain sections.

20. Method as claimed in claim 11, characterised in that the actual value of the temperature of the drive element (2) or the induced voltage or the induced current is detected by a measuring means (17) and transmitted to a control unit (15) and whenever the actual value of the minimum temperature deviates from at least one pre-set threshold value for the minimum temperature, the control unit (15) regenerates a signal for further processing or output in or on the control unit (15).

21. Method as claimed in claim 1 characterised in that the actual value of the minimum temperature is pre-set by an operator or by means of a control algorithm and the energy supply to the drive element (2) by the module (12) is regulated.

22. Moving unit (1), in particular for applications involving freezing or deep-freezing, having a drive element (2), such as a band, belt or similar, and a machine part, the drive element (2) and the machine part being mounted so as to be displaceable relative to one another, and at least one module (12) which generates and/or transmits energy co-operates with the drive element (2) in order to heat at least certain regions of the drive element (2), in particular by applying the method as claimed in claim 1, characterised in that the module (12) extends across a part of a length of the drive element (2) and at least one measuring means (17) co-operates with the drive element (2) in order to detect an actual value of the temperature of the drive element (2) and is connected to a control unit (15) which activates the module (12).

23. Moving unit as claimed in claim 22, characterised in that the module (12) is provided in the form of at least one induction coil (13) or at least one microwave generator (26) for generating an energy field (16) or heat flow (35) actively connected to the drive element (2).

24. Moving unit as claimed in claim 22, characterised in that the module (12) is provided in the form of a heating device, such as a heating coil, or a heat-radiating element such as a heat exchanger, fan heater, in order to generate a thermal energy field which is actively connected to the drive element (2).

25. Moving unit as claimed in claim 22, characterised in that the module (12) is disposed on or in the machine part (20) or is constituted by the latter.

26. Moving unit as claimed in claim 22, characterised in that the drive element (2) has at least one loop (10) made from electrically conductive material.

27. Moving unit as claimed in claim 26, characterised in that the loop (12) is provided in the form of at least one strengthening support (9) extending across the length of the drive element (2).

28. Moving unit as claimed in claim 26, characterised in that the loop (10) is provided in the form of at least one electrically conductive film (36), in particular a copper film, a film (36) of steel alloy or spring steel, extending across the length and at least across a part of a width of the drive element (2).

29. Moving unit as claimed in claim 26, characterised in that the drive element (2) incorporates the strengthening support (9) and/or the film (36) and the strengthening support (9) and/or film (36) is made from electrically conductive material.

30. Moving unit as claimed in claim 26, characterised in that the loop (10) has a coil.

31. Moving unit as claimed in claim 27, characterised in that at least one of the strengthening supports (9) acts as a ferromagnetic core, in particular an iron core.

32. Moving unit as claimed in claim 27, characterised in that the strengthening support (9) is made from aramide or steel and glass fibre.

33. Moving unit as claimed in claim 22, characterised in that the module (12) is disposed externally to the drive element (2) and is stationary or is displaceable relative to the drive element (2) in the direction extending parallel with or transversely to the loop (12).

34. Moving unit as claimed in claim 22, characterised in that the module (12) extending at least substantially around the drive element (2) is provided in the form of primary induction coil (13) which is preferably disposed perpendicular to a feed direction (5) of the drive element (2), and the loop (10) actively connected to the induction coil (13) forms a secondary coil.

35. Moving unit as claimed in claim 23, characterised in that at least one module (12) for generating the energy field is provided on, in or inside a housing-type casing surrounding the drive element (2).

36. Moving unit as claimed in claim 23, characterised in that a frequency and/or current amplitude of the induction coil (13) to which alternating current is to be applied is adjusted depending on a minimum temperature, in particular an operating temperature, of the drive element (2).

37. Moving unit as claimed in claim 22, characterised in that the drive element (2) has at least one passage (24) preferably extending across the length and across a part of the width thereof for accommodating a liquid (25) with a high boiling point and wave energy generated by the module (12) can be applied to the heat-transmitting liquid (25) with a high boiling point.

38. Moving unit as claimed in claim 22, characterised in that the moving unit (1) incorporates another machine part and the other machine part is guided on a guide mechanism (21) and can be displaced by the drive element (2).

39. Moving unit as claimed in claim 22, characterised in that the moving unit (1) has at least one driving and driven member (3, 4), in particular discs, made at least partially from electrically conductive material for deflecting the endless drive element (2) and a positive potential is applied to one of the discs and negative potential is applied to the other disc, and electric contacts (32) are provided on the drive element (2) for transmitting the preferably electrical energy between the discs and the contacts (32) as a result of contact.

40. Moving unit as claimed in claim 39, characterised in that the peripheral zone facing the drive element (2) and surrounding a core zone of the disc is made from electrically conductive material and the core zone is made from an insulating material, in particular plastic.

41. Moving unit as claimed in claim 26, characterised in that a closed loop (10) of the preferably non-endless stationary drive element (2) is preferably connected by wires via electrical contacts, in particular terminal contacts, to a power source generating current, in particular a direct current source to enable current to be applied.

42. Moving unit as claimed in claim 22, characterised in that the drive element (2) is a flat belt or V-belt or cogged belt.

43. Moving unit as claimed in claim 22, characterised in that the drive element (2) has a running layer (6), a top layer (7) and at least one traction layer (8) disposed in between and at least one loop (10) and/or film (36) of electrically conductive material is disposed in the traction layer (8).

44. Moving unit as claimed in claim 22, characterised in that at least one measuring means (17), for detecting the temperature of the drive element (2) is disposed in or directly on the drive element (2) and is provided in the form of a strain gauge, thermocouple or pyrometer in particular.

45. Moving unit as claimed in claim 44, characterised in that the measuring means (17) is connected to the control unit (15) and the control unit (15) has a control algorithm for at least regulating the temperature and/or the peripheral speed and feed rate of the drive element (2).

* * * * *